US007431790B2

(12) United States Patent
Birk

(10) Patent No.: US 7,431,790 B2
(45) Date of Patent: Oct. 7, 2008

(54) MANIPULATION-PROTECTED FOIL STRUCTURE FOR LABELS AND METHOD FOR ITS MANUFACTURE

(75) Inventor: Uwe Birk, Munich (DE)

(73) Assignee: Schreiner Group GmbH & Co. KG, Oberschleissheim (DE)

(*) Notice: Subject to any disclaimer, the term of this patent is extended or adjusted under 35 U.S.C. 154(b) by 394 days.

(21) Appl. No.: 10/953,214

(22) Filed: Sep. 28, 2004

(65) Prior Publication Data

US 2005/0079320 A1 Apr. 14, 2005

(30) Foreign Application Priority Data

Oct. 8, 2003 (DE) ................................ 103 46 683

(51) Int. Cl.
*B29C 65/16* (2006.01)
*B32B 38/04* (2006.01)

(52) U.S. Cl. .................... 156/253; 156/268; 156/272.8; 156/277

(58) Field of Classification Search ................. 156/253, 156/268, 270, 272.8, 277; 283/81, 72, 85, 283/101, 117, 901; 428/40.1, 41.7, 343, 428/916; 40/299.01
See application file for complete search history.

(56) References Cited

U.S. PATENT DOCUMENTS

| | | | | |
|---|---|---|---|---|
| 3,626,143 A | | 12/1971 | Fry | |
| 4,947,567 A | | 8/1990 | Hermann | |
| 5,238,272 A | * | 8/1993 | Taylor | 283/79 |
| 5,421,933 A | * | 6/1995 | Nedblake et al. | 156/249 |
| 5,895,075 A | * | 4/1999 | Edwards | 283/81 |
| 6,066,437 A | | 5/2000 | Kösslinger | |
| 6,103,989 A | * | 8/2000 | Jennings et al. | 219/121.67 |
| 6,953,206 B1 | * | 10/2005 | Dilz et al. | 283/72 |
| 2004/0112010 A1 | * | 6/2004 | Richards et al. | 53/415 |

FOREIGN PATENT DOCUMENTS

| | | |
|---|---|---|
| DE | 196 42 040 | 1/1998 |
| DE | 196 30 690 | 2/1998 |

(Continued)

OTHER PUBLICATIONS

English Translated Abstract JP-2003-108003A.*

(Continued)

*Primary Examiner*—Yewebdar T Tadesse
(74) *Attorney, Agent, or Firm*—Collard & Roe, P.C.

(57) ABSTRACT

The laser beam (204) violates the foil layer (203) in an upper part region (203*b*) whereas this remains intact in a lower part region (203*a*). During the production of lines of weakening by laser action the degree of foil weakening can be controlled substantially more accurately than in conventional punching and cutting processes to produce lines of weakening. The composite foil (201) is sufficiently tear-resistant during application that it can be dispensed without any problem onto an object to be stuck without tears or any risk of destruction. As soon as the adhesive (202) develops its effect however, the foil structure can no longer be removed without any residue: the violation of the foil layer (203) has the effect that the self-adhesive composite tears off uncontrollably without fail during a manipulation attempt. This thus ensures extremely high security of the foil structure (201) or of a label formed therefrom against undesirable manipulation.

10 Claims, 4 Drawing Sheets

FOREIGN PATENT DOCUMENTS

| | | | | |
|---|---|---|---|---|
| DE | 3802341 | | | 10/1999 |
| DE | 299 13 746 | | | 11/1999 |
| DE | 199 09 723 | | | 9/2000 |
| EP | 0756738 | | | 7/1998 |
| JP | 56-26775 | | | 3/1981 |
| JP | 3-66873 | | | 6/1991 |
| JP | 08-118054 | | | 5/1996 |
| JP | 09-038789 | | | 2/1997 |
| JP | 2001-062577 | | | 3/2001 |
| JP | 2003108003 | A | * | 4/2003 |
| WO | WO00/54243 | | * | 9/2000 |

OTHER PUBLICATIONS

European Search Report.

* cited by examiner

MANIPULATION-PROTECTED FOIL STRUCTURE FOR LABELS AND METHOD FOR ITS MANUFACTURE

CROSS REFERENCE TO RELATED APPLICATIONS

Applicant claims priority under 35 U.S.C. §119 of German Application No. 10346683.5 filed Oct. 8, 2003.

BACKGROUND OF THE INVENTION

1. Field of the Invention

The present invention relates to a manipulation-protected foil structure and a method for its manufacture.

2. The Prior Art

Many applications of self-adhesive foils or labels require precautions which prevent the foil or label from becoming detached from the object to which it was originally attached, and wrongly stuck on another object. This particularly applies to self-adhesive identification plates, for example, for the unique identification of products or for product protection.

In order to make the misuse of such foils more difficult, hitherto a relatively unstable foil material was frequently selected and the adhesive bond to the base was constructed as so strong that the foil tears when an attempt is made to detach it intact from the base. However, the mechanically less stable foils required for this purpose are generally more expensive than more tear-proof foil material.

A so-called repositionability of the foil or of the labels made from the foil is frequently required by the user. By this is understood the possibility of removing and being able to re-position the foil or the label stuck onto an object within a certain time after application, possibly to correct an incorrect position or orientation. Only after this time should such a foil or such a label be no longer detachable intact. This repositionability cannot be achieved with the known mechanically weak foil material which already has an imminent tendency to tear.

A further known measure for making it difficult to detach foils or labels intact consists in providing lines of weakening in the foil. Lines of weakening are subsequently also to be understood as lines of interruption i.e., lines along whose profile a foil or foil layer is cut through its total thickness. Lines of weakening are usually stamping or punching lines but can also be executed as cuts, perforations, scoring or the like. In the stuck-on state, the lines of weakening prevent the complete foil or the complete label from being removed since this tears into individual parts along the lines of weakening or starting therefrom. The individual parts cannot be joined together again or only at great expense.

If the lines of weakening inside a label run continuously from edge to edge, there is the problem that it is difficult to dispense the label since the part regions of the label formed by the lines of weakening are only weakly held together, for example, by the non-co-weakened adhesive layer of the label, between the dispensing from the label supporting web made of pull-off material and the adhesion onto the object as intended. Such labels are the usual standard for-price marking in supermarkets. In order to increase the stability of the label during dispensing, the lines of weakening can be interrupted by cross-pieces whereby the foil stays cohesive. However, this usually only works with selected geometries of label and arrangement of lines of weakening and because labels are usually punched out of cohesive material webs which are provided with lines of weakening before the punching process. If the punching position of the labels is unfavorable relative to the lines of weakening, larger regions, for example, at the corners of a label, can be separated from the remainder of the label by a line of weakening.

The label structure known from the German Utility Model DE 299 13 746 U1 attempts to counteract these difficulties, whereby in addition to a layer provided with lines of weakening and an adhesive layer for fixing to a base, there is also provided a continuous upper foil which is affixed by means of adhesive to the layer provided with lines of weakening. The upper foil holds the layer together and ensures that the label is repositionable. Moreover, there is thus a smooth and therefore high-resolution printable surface. When such a structure is realized using cheap, mechanically relatively stable foils however, the problem again arises that the upper foil can be pulled off and stuck onto another object. The protection against manipulation originally strived for by the lines of weakening is thus no longer fully guaranteed.

However, labels and foils not only of the aforesaid type are generally inscribed or must be inscribed, frequently individually. Sometimes, laser inscription methods are used here. In this case, a laser-sensitive layer in the foil structure to be inscribed locally changes its color as a result of laser irradiation or is locally ablated by the laser action. The inscription is produced by moving the laser along the desired sign contours. In the latter case, the laser-sensitive layer can lie under a laser-transparent laminate so that the removed particles do not enter the atmosphere. Such a structure is described, among other thing in the German Patent Specification DE 196 42 040 C1. However, the laser-sensitive layer can also be constructed as the uppermost layer of the foil structure so that the particles are released.

SUMMARY OF THE INVENTION

In view of the problems described above, the object forming the basis of the present invention is to provide a manipulation-proof foil structure for labels and the like in which the problems described do not arise or only to a reduced extent. If possible, the foil structure should also be suitable for laser-inscribable foils and labels. Equally it is the object of the present invention to provide a cheap method of manufacturing such a foil structure which results in a high product quality.

According to one aspect of the present invention, the object is solved by a method for manufacturing a manipulation-protected foil structure in which a foil structure is prepared having at least one foil layer which can be weakened by laser action and an adhesive coating for sticking to a base, and lines of weakening are produced by laser action in at least one of the foil layers of the foil structure. Preferred embodiments of the method according to the invention are discussed below. (The phrase "majority of the label" as used herein means more than half the dimension of the label in the corresponding direction).

According to a further aspect of the invention, the object is solved by a foil structure having at least one foil layer which can be weakened by laser action, with at least one laser-produced line of weakening and an adhesive coating on the underside. Preferred embodiments of the foil structure according to the invention are discussed below.

According to a further aspect of the present invention, the object is solved by a foil structure serving as raw material for the method according to the invention. In this foil structure, at least one of the lines of weakening in the foil layer, which can be weakened by laser action, extends in the direction of its largest expansion over at least the majority of the label.

The present invention is treading a new path to guarantee protection against manipulation by using a foil which is violated but not cut through by a laser beam. During the production of lines of weakening by laser action, the degree of foil weakening can be controlled substantially more accurately than in conventional punching and cutting processes to produce lines of weakening. Furthermore, inscription and protection against manipulation can be applied within one operation in a fashion which is surprising for the person skilled in the art, which brings decisive advantages with regard to cost effectiveness and quality management.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings.

Exemplary embodiments according to the invention are explained in detail below with reference to the relevant drawings which should be regarded as purely schematic. The drawings are not to scale, in particular layer thicknesses are severely exaggerated for reasons of clarity. All drawings are in each case a side view of a foil structure according to the invention. (Features corresponding to one another each have reference numbers with the same end numbers in the different figures, the leading number of the reference number being the same as the number of the respective figure).

DETAILED DESCRIPTION OF PREFERRED EMBODIMENTS

Figure 1:
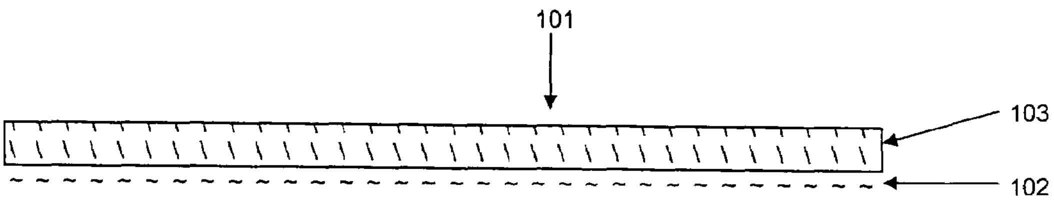
FIG. 1 shows the preliminary stage of a substantially single-layer foil structure according to the invention.
Figure 2:
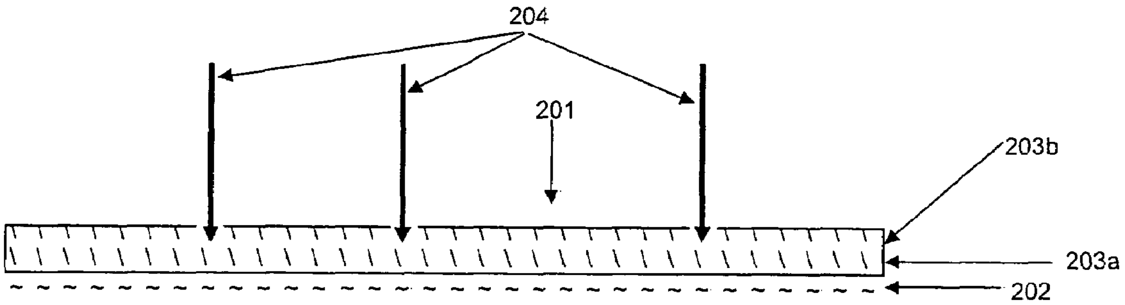
FIG. 2 shows the same foil structure during treatment by means of a first laser.

Turning now in detail to the drawings, the basic principle of the invention can be identified from FIGS. 1 and 2.

The foil structure 101 substantially consists of a foil layer 103 which can be weakened by laser action, which is coated with adhesive 102 on the underside. For the foil layer 103 it is possible to use a polyester foil which has sufficient tearing strength and thermal stability to keep the foil structure 101 stable.

In FIG. 2 the same foil structure 201 having the end numbers numbered the same as the reference number is shown during treatment by a laser beam 204. Thus, foil structure 201 includes foil layer 203 coated with adhesive 202 on the underside. The laser beam 204 violates the foil layer 203 in an upper part region 203*b* whilst this remains intact in a lower part region 203*a*. The intact lower part region 203*a* preferably has a thickness of less than half, preferably less than a third of the total thickness of the foil layer 203.

Such a foil structure 101, 201 is distinguished by the following advantages after treatment with a laser beam 204:

- It is sufficiently tear-resistant during application that it can be dispensed without any problems onto an object to be stuck without tears or any risk of destruction.
- As a result of the unviolated region 203*b*, it is more resistant to external influences compared to a composite foil which has been completely cut through using a laser.
- Under low-intensity laser irradiation, its violation is barely visible to the naked eye, i.e., it continues to appear as a flat surface.
- After the violation there is still a completely cohesive composite.
- If the material is suitably selected, i.e., if the foil layer 103, 203 is suitably selected with reference to the adhesive force of the adhesive 102, 202 and if the adhesive is suitably selected, repositioning is still possible about half an hour after application.
- However, as soon as the adhesive 102, 202 completely develops its effect, the foil structure can no longer be pulled off free from residue; the violation of the foil layer 102, 203 has the effect that the self-adhesive bond tears uncontrollably without fail when a manipulation attempt is made. An extremely high security of the foil structure 101, 201 or a label formed therefrom against undesired manipulation is thereby ensured.
- In principle, only a single foil layer 103, 203 is required to ensure protection against manipulation.

The foil layer 103, 203 which can be weakened by laser action, must be so constituted as a result of the choice of material, its thickness and depending on the energy of the laser 204 that it is ensured that as a result of its violation, it has the afore-mentioned properties of sufficient stability (to ensure repositionability) and at the same time, sufficient violation (to ensure security against manipulation)

Figure 3:
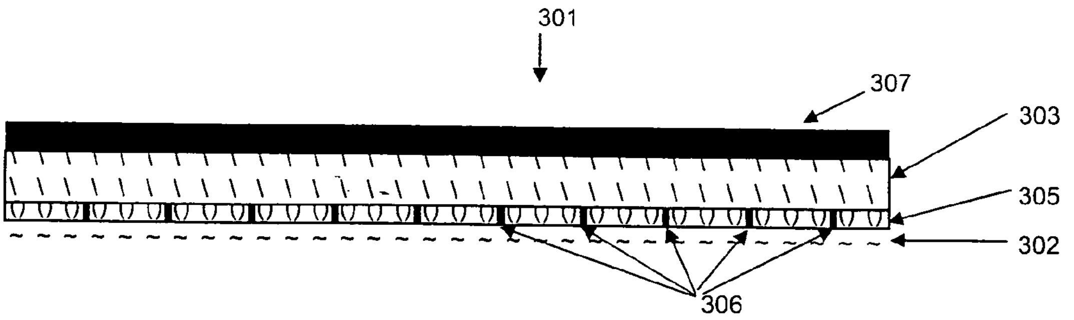
FIG. 3 shows a first especially preferred embodiment of the foil structure according to the invention before the treatment by a laser.

An especially preferred embodiment of a foil structure 301 in FIG. 3 substantially consists of a foil layer 303 which can be violated by laser and which is additionally provided with a laser-sensitive layer 307 on the upper side. Located thereunder is a further foil layer 305 which is provided with an adhesive 302 on the underside. For manipulation security against undesired removal of the foil structure or a label formed therefrom, weakenings 306, for example, in the form of punched lines are applied in the further foil layer 305.

Figure 4:
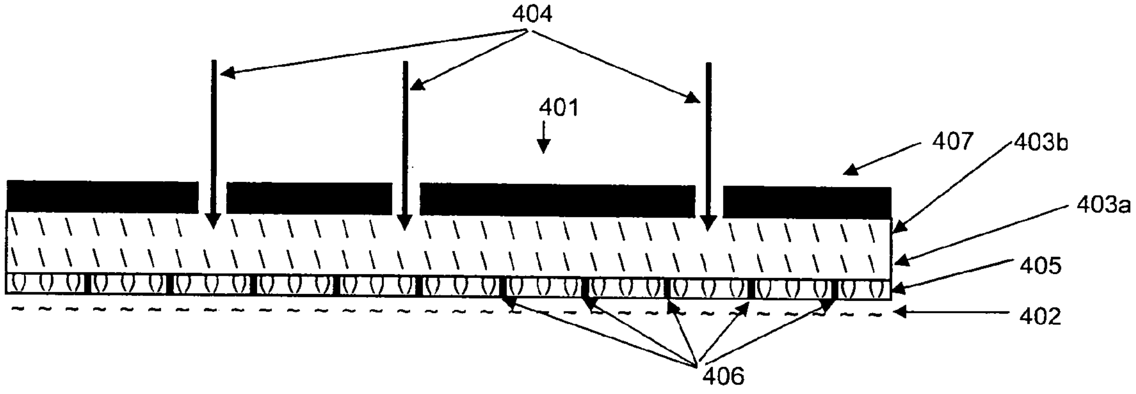
FIG. 4 shows the same especially preferred embodiment during the treatment with the laser.

In FIG. 4 the foil 401 having the end numbers numbered similarly to the reference numbers is processed with a laser beam 404. Foil layer 401 includes a further foil layer 405 provided with an adhesive 402 on the underside. In this case, the laser-sensitive layer 407 is removed in the regions provided for the inscription. Furthermore, the foil layer 403 which can be weakened by laser action is weakened in an upper part region 403*b* whilst it remains intact in the lower part region 403*a*.

As a result of the weakenings 306, 406 in the additional foil layer 305, 405, in principle the same effect is obtained as in the foil structure 101, 201 according to FIGS. 1-2. Particularly advantageous in this embodiment however are

- the strengthening of the foil structure 301, 401 by a further foil layer and
- the violation of the foil layer 303, 403 and the inscription of the laser-sensitive layer 307, 407 within the same operation.

With such a foil structure 301, 401 it is also possible according to the invention to achieve complete cutting through the weakenable foil layer 303, 403 if its lines of weakening are not completely congruent with the lines of weakening 306, 406 of the pre-weakened foil layer 305, 405 but are offset with respect to these in a common projection plane and/or are at an angle or intersect these in the common projection plane.

Figure 5:
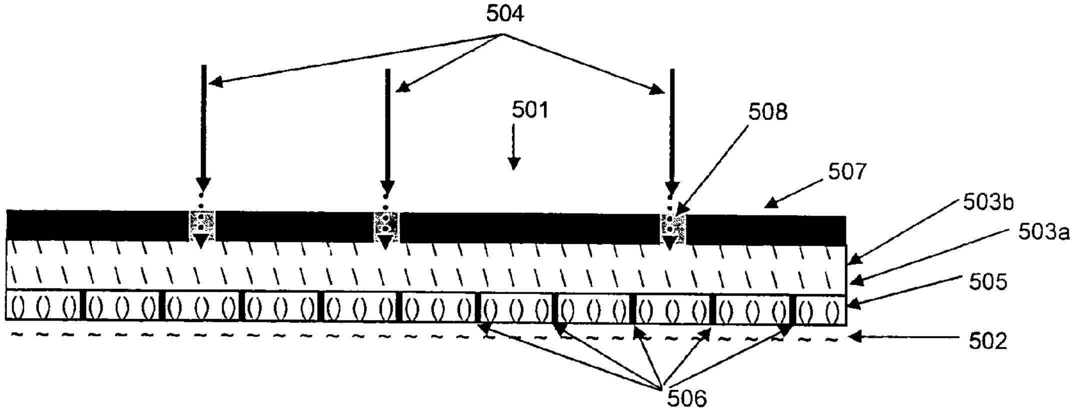
FIG. 5 shows a modification of the embodiment shown in FIGS. 3 and 4.

As in FIGS. 3-4, FIG. 5 shows a composite foil 501 with an adhesive coating 502 and an additional foil layer 505 having punchings 506. In this case, the layer structure is in principle the same as in FIGS. 3 and 4 with the difference that the laser-sensitive layer 507 is not a removable layer but a layer which changes it color in the regions 508 treated by laser light. When the laser 504 is correctly applied, sufficient radiation can penetrate through such a laser-sensitive layer 507 to violate the foil layer 503 located thereunder, which can be weakened by laser action, in its upper region 503*b* whilst the lower region 503*a* remains unviolated.

The foil layer 303, 403 which can be weakened by laser action in FIGS. 3-4 preferably comprises a transparent support layer which ensures that a contrast between the laser-removable layer 307, 407 and the additional foil layer 305, 405 remains identifiable. In this case however, the foil layer 503 which can be weakened by laser action can be freely determined in its coloring and opacity since it is not visible after the laser action.

Figure 6:
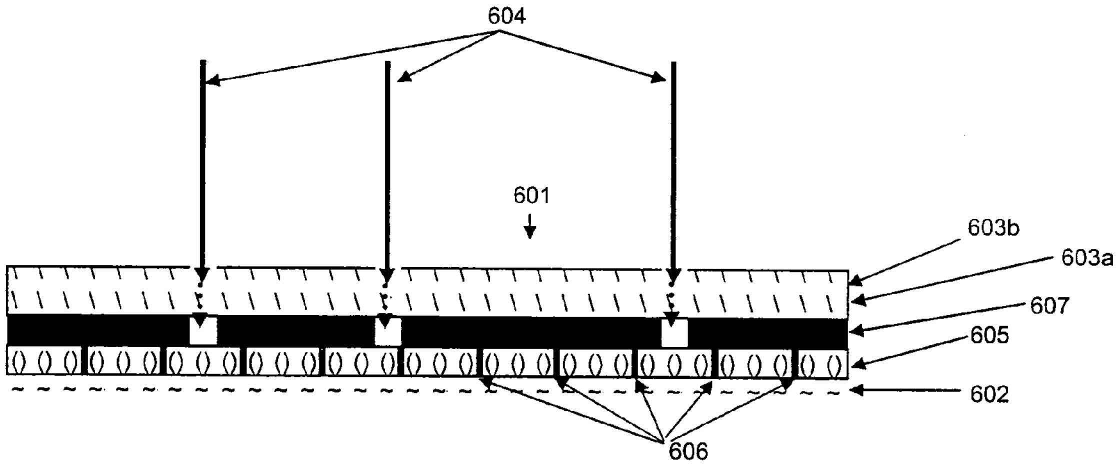
FIG. 6 shows a further especially preferred embodiment.

FIG. 6 shows a structure for an inscription method as is known in principle from DE 196 42 040 C1. This comprises a laser foil 601 in which the foil layer 603 which can be weakened by laser action is arranged over the laser-ablatable layer 607. Foil layer 603 includes upper region 603*b* and lower region 603*a*. Again, if the parameters of the laser 604 are skillfully adjusted, it is possible for the foil layer 603 which can be weakened by laser action, to be violated whilst simultaneously removing the laser-sensitive layer 607 which can comprise a metallization. Located under the laser-sensitive layer 607 again is an additional foil layer 605 having lines of weakening 606 with adhesive coating 602 on the underside.

Figure 7:
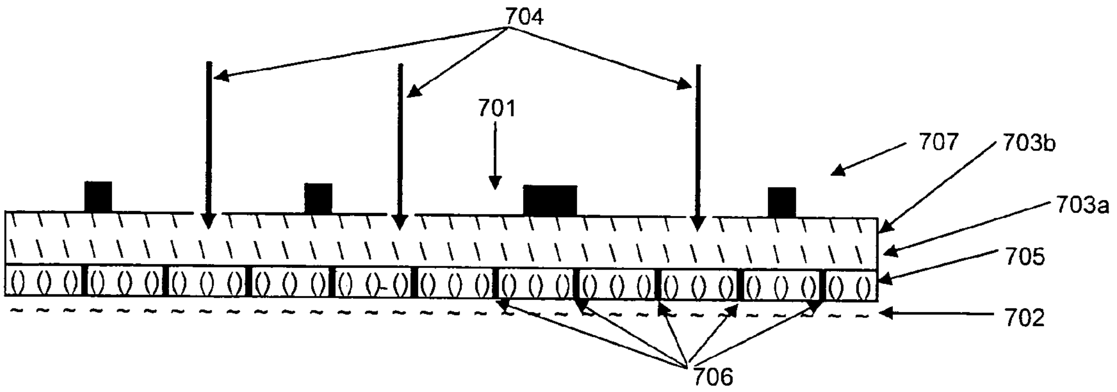
FIGS. 7 and 8 show two variants of a further especially preferred embodiment.
Figure 8:
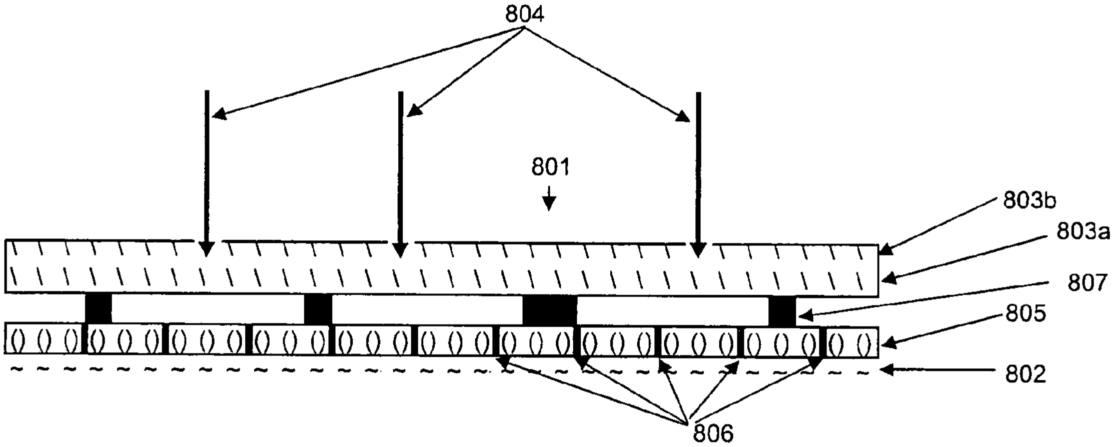

The principle of this embodiment can also be applied to other foil structures which are not usually provided for being laser-treated, for example, simple identification labels which are printed by means of thermal, transfer, inkjet or the conventional classical printing methods (letterpress, flexographic, screen or offset printing). This is shown in FIGS. 7-8:

FIG. 7 shows the variant of a foil structure 701 in which the foil layer 703 which can be weakened by the action of the laser 704, lies under an inscription 707 or serves as the basis for a later inscription 707. FIG. 8 shows the foil layer 803 which can be weakened by action of the laser 804, as a laminate (in this case, preferably transparent) over an inscription 807.

In both cases, an additional foil layer 705, 805 is again provided with weakenings 706, 806 and an adhesive coating 702, 802. The foil layer 703, 803 in foil structure 701, 801 includes upper region 703*b*, 803*b* and lower region 703*a*, 803*a*, respectively.

Although only a few embodiments of the present invention have been shown and described, it is to be understood that many changes and modifications may be made thereunto without departing from the spirit and scope of the invention as defined in the appended claims.

What is claimed is:

1. A method for manufacturing a manipulation-protected foil structure which has at least the following steps;

(a) preparing a foil structure having at least one foil layer, and at least one pre-weakened further foil layer, wherein said at least one foil layer and said at least one pre-weakend foil layer can be weakened by laser action, and an adhesive coating on an underside for sticking to a base, wherein said at least one pre-weakened further foil layer is disposed between said at least one foil layer and said adhesive coating; and (b) producing lines of weakening in at least one of said at least one foil layer of the foil structure by laser action.

2. The method according to claim 1, wherein the degree of weakening of said at least one foil layer by the lines of weakening and an adhesive force of the adhesive coating on the base are matched to one another such that the foil structure tears when an attempt is made to detach it from the base.

3. The method according to claim 1 wherein the thickness of said at least one foil layer along each line of weakening is weakened to half or less of its original thickness.

4. The method according to claim 3 wherein the thickness of said at least one foil layer along each line of weakening is weakened to a third or less off its original thickness.

5. The method according to claim 1, wherein the foil structure is prepared in a form of a web and the method further comprises the step of cutting out or punching out of labels from the web.

6. The method according to claim 5, wherein at least two lines of weakening are formed on the labels.

7. The method according to claim 1, wherein the at least one pre-weakened further foil layer is pre-weakened by lines of weakening.

8. The method according to claim 7, wherein the profile of the lines of weakening in the at least one foil layer which can be weakened by laser action, deviates in the projection from the profile of the lines of weakening of the at least one further pre-weakened foil layer if a projection plane parallel to said at least one foil layer is assumed.

9. The method according to claim 1, wherein said at least one foil layer which can be weakened by laser action, is a polyester foil.

10. The method according to claim 1, wherein said foil structure comprises a foil layer and wherein the method further comprises the step of sticking the label onto a base and wherein the lines of weakening are produced after the sticking on.

* * * * *